(No Model.) 2 Sheets—Sheet 1.

W. B. MILLER & W. H. BELL.
FARM GATE.

No. 247,094. Patented Sept. 13, 1881.

Witnesses:
Edmond Brodhag
Philip F. Larner

Inventors:
Wilson B. Miller
William H. Bell
by Johnson & Johnson
Attys (No Model.) 2 Sheets—Sheet 2.

W. B. MILLER & W. H. BELL.
FARM GATE.

No. 247,094. Patented Sept. 13, 1881.

Witnesses:
Edmond Brodhag
Philip F. Larner

Inventors:
Wilson B. Miller,
William H. Bell
by Johnson & Johnson
Attys

UNITED STATES PATENT OFFICE.

WILSON B. MILLER AND WILLIAM H. BELL, OF SHERMAN, TEXAS.

FARM-GATE.

SPECIFICATION forming part of Letters Patent No. 247,094, dated September 13, 1881.

Application filed August 1, 1881. (No model.)

*To all whom it may concern:*

Be it known that we, WILSON B. MILLER and WILLIAM H. BELL, citizens of the United States, residing at Sherman, in the county of Grayson and State of Texas, have jointly invented new and useful Improvements in Farm-Gates, of which the following is a specification.

In improving swinging farm-gates we have made provision by simple and effective means for taking up the sag of the latch end of the gate and for setting it at different heights. The gate is mounted upon a hinge-rod, which is adapted for adjustment at its upper end within a rack fixed to the top of the hinge-post and provided with a pivoted keeper for said hinge-rod, the object being to set the upper end of the hinge-rod away from the latch-post as may be required to raise the free end of the gate to take up the sag, to support the gate a sufficient height above the ground to swing free of snow, and to allow of the passage of small stock when the gate is closed.

Figure 1:
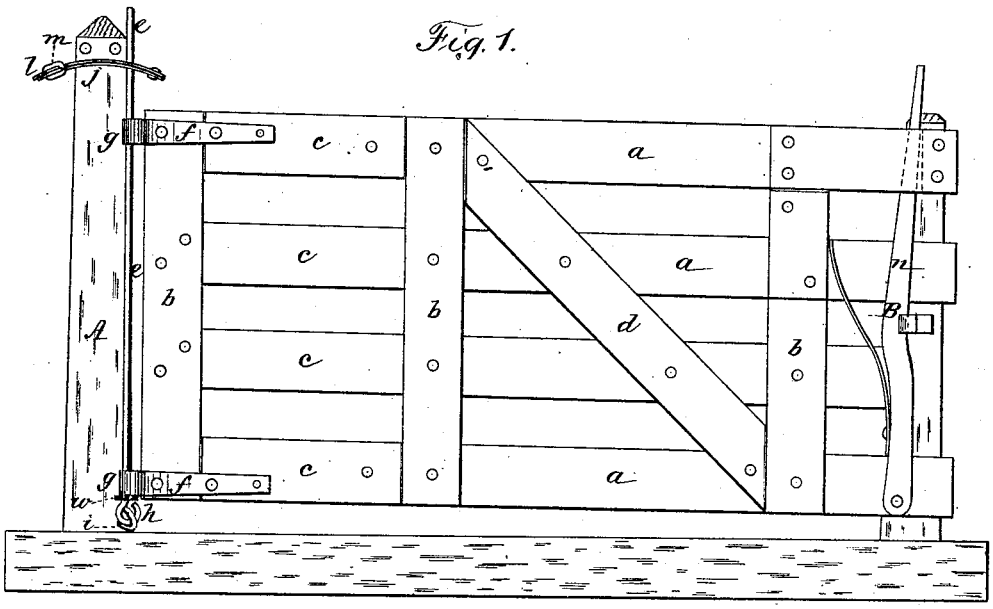
Figure 2:
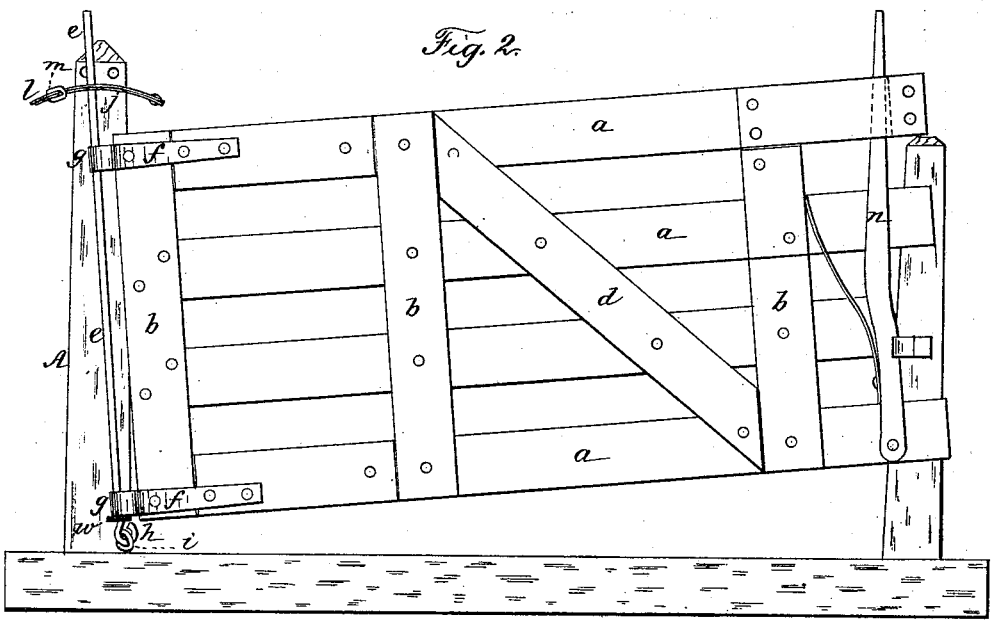
Figure 3:
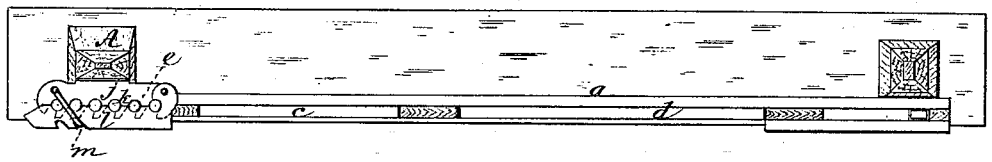
Figure 4:
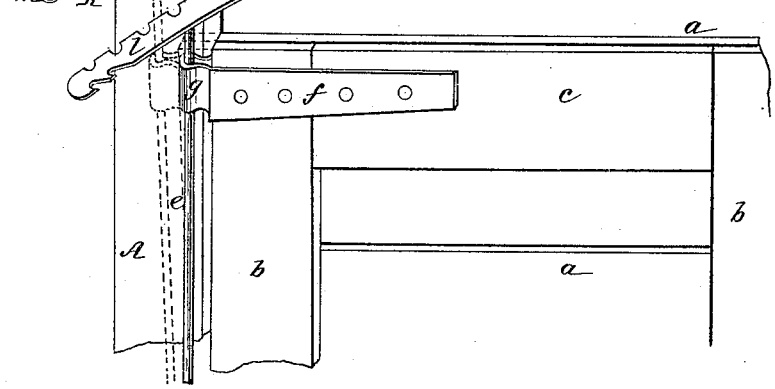

Referring to the accompanying drawings, Figure 1 represents an elevation of a gate embracing our improvements; Fig. 2, a similar view, the swinging end of the gate being shown as raised by setting back the upper end of its hinge-rod within its rack confining plate; Fig. 3, a top view of the gate as closed, and Fig. 4 the hinge-rod rack with the pivoted keeper turned out as in adjusting the hinge-rod.

The gate may be of any suitable construction, the horizontal bars *a* being rigidly connected by vertical bars *b*, and strengthened and braced by short bars *c* and a diagonal brace, *d*, secured to the horizontal bars between the outer and inner vertical bars, as shown.

The gate is mounted upon a rod, *e*, by strap-hinges *f f*, which form eyes *g g*, and are secured on both sides of the gate. The lower end of the rod is formed into an eye, *h*, and is secured in a staple or eye, *i*, fastened into the post A, and upon which eyed rod support the gate swings by reason of the rod passing through the hinge-eyes *g g*, and having a bearing in a rack-plate, *j*, fixed to and projecting from the said post, above and in line with the gate when closed. The rack *j* forms a pivot-bearing for the hinge-rod, and is secured to the side of the post at which the gate opens. It is preferably of cast-iron, stands out horizontally from the post A, and is formed with teeth or notches *k* on its outer edge, which serve to receive and form the upper pivot-bearing for the hinge-rod.

A keeper or locking-arm, *l*, is pivoted to the rack, so as to close with or over its notched or toothed edge and confine the hinge-rod therein, as shown in Fig. 3. A link, hook, or catch, *m*, carried by the rack hooks into a notch in the keeper, and serves to embrace and secure its free end when closed, and to allow of its being opened or turned out to uncover the teeth for adjusting the hinge-rod, as may be required. The keeper may or may not be toothed or notched to correspond with the rack, as its function is to hold the upper end of the hinge-rod within its bearing in the rack. The teeth of the rack incline back, as shown, the better to hold the hinge-rod and relieve the pivoted keeper of undue strain.

In raising the swing end of the gate it is only necessary to open the pivoted keeper from the rack and set the upper end of the hinge-rod back one tooth or notch or more and close and fasten the keeper by the link. In this adjustment the hinge-rod is supported by the eyed post connection, and stands out of vertical line with the hinge-post, and as the said rod is thus set back one or more teeth, so will the free end of the gate be raised more or less and swing on an incline with the ground; or the gate can be set to open on a level with the ground.

A spring pivoted latch, *n*, serves to fasten the gate to the latch B when closed.

A washer, *w*, forms the bearing for the gate, the lower hinge resting upon said washer at the eyed connection of the hinge-rod.

We have shown the keeper for the hinge-rod as pivoted to the rack; but it is obvious that it may be attached to the post.

We claim—

1. A swinging gate carried by a hinge-rod having a fixed foot-connection with the post, the said hinge-rod being adapted for adjustment at its upper end within a rack carried by said post, and having a confined bearing within said rack, substantially as described, for the purpose specified.

2. In a swinging gate, the combination, with the gate mounted upon a hinge-rod supported by an eyed foot post connection, substantially as described, of a supporting-rack for said hinge-rod, fixed to and projecting from the top of said post, and a keeper for said hinge-rod, substantially as described, for the purpose specified.

In testimony whereof we have hereunto set our hands in the presence of subscribing witnesses.

WILSON B. MILLER.
WILLIAM H. BELL.

Witnesses as to Miller:
WILLIAM W. WHITE,
P. W. BROWN.

Witnesses as to Bell:
J. H. L. DICKERMAN,
H. N. TUCK.